United States Patent [19]

Rakestraw et al.

[11] Patent Number: 4,643,662
[45] Date of Patent: Feb. 17, 1987

[54] PELLETIZING APPARATUS

[75] Inventors: Lawrence F. Rakestraw, Chesterfield; Harry M. Stevens, Ballwin, both of Mo.

[73] Assignee: Monsanto Company, St. Louis, Mo.

[21] Appl. No.: 726,293

[22] Filed: Apr. 23, 1985

Related U.S. Application Data

[63] Continuation-in-part of Ser. No. 618,627, Jun. 8, 1984, abandoned.

[51] Int. Cl.$^4$ .............................. B01J 2/00; B29B 9/08; B29C 67/02
[52] U.S. Cl. .................................... 425/222; 425/333
[58] Field of Search .............................. 425/6, 222, 333

[56] References Cited

U.S. PATENT DOCUMENTS

| | | | |
|---|---|---|---|
| 2,707,304 | 5/1955 | Haley | 425/222 |
| 2,876,491 | 3/1959 | Meyer | 425/222 |
| 2,995,255 | 8/1961 | Demeter | 210/512 |
| 3,060,496 | 10/1962 | McDowell et al. | 425/223 |
| 3,161,707 | 12/1964 | Stirling | 425/222 |
| 3,187,837 | 6/1965 | Beeching | 181/58 |
| 3,358,580 | 12/1967 | Freese et al. | 98/121 |
| 3,618,299 | 11/1971 | Vincent | 55/446 |
| 3,834,850 | 9/1974 | Takewell et al. | 425/222 |
| 4,259,053 | 3/1981 | Wahli | 425/222 |

FOREIGN PATENT DOCUMENTS 1138181 5/1960 Fed. Rep. of Germany ........ 55/446

Primary Examiner—Willard E. Hoag
Attorney, Agent, or Firm—W. W. Brooks; A. H. Cole

[57] ABSTRACT

An apparatus is provided for pelletizing finely divided particulate or pulverant materials. The apparatus is particularly effective in pelletizing large quantities of such particulate materials to a desirable spheroidal pellet size.

5 Claims, 4 Drawing Figures

PELLETIZING APPARATUS

CROSS-REFERENCE TO RELATED APPLICATIONS

This application is a continuation-in-part of copending application Ser. No. 618,627, filed June 8, 1984 now abandoned.

BACKGROUND OF THE INVENTION

1. Field of the Invention

This invention relates to an apparatus for pelletizing or agglomerating finely divided particulate or pulverant materials into spheroidal pellets of an advantageous pellet size distribution in preparation for subsequent treatment in which it is advantageous and desirable to have the material in the form of pellets or balls.

2. Description of the Prior Art

Apparatus disclosed by the prior art for pelletizing finely divided particulate materials include rotating discs or drums, sometimes referred to in general as balling devices. As an example of such prior art devices, an inclined balling drum is described in U.S. Pat. No. 2,707,304 as suitable for the formation of balls, pellets, or glomerules from moisture-containing pulverant material. To similar effect is an apparatus described in U.S. Pat. No. 3,060,496 as a frusto-conical drum of relatively small depth (read pan) useful to pelletize moisture-containing pulverant material. In U.S. Pat. No. 2,876,491, an inclined pelletizing disc is described. The apparatus consists of a rotary inclined disc having a collar extending outward from the damming edge which is inclined to the plane of the disc at an angle of 5° to 20°, preferably 10° to 15°.

For a general review of balling devices, see *The Encyclopedia of Chemical Process Equipment*, Mead, Ed., Reinhold Publishing Corp., New York, 1964, pp. 48–50.

Although the prior art devices are generally successful in providing pellets of suitable size distribution from finely divided particulate materials, they nonetheless suffer from various disadvantages and difficulties. Principal among these disadvantages and difficulties are apparatus complexity, a less than rapid rate of pelletization for large quantities of material, and high cost of equipment. Thus, the discovery of an apparatus suitable for pelletizing finely divided particulate materials into spheroidal pellets of an advantageous pellet size distribution, which apparatus (1) has no motors or moving parts and (2) is simple to construct from readily available and relatively inexpensive materials is believed to be a decided advance in the state of the art.

SUMMARY OF THE INVENTION

It is an object of this invention to provide an apparatus for the pelletization of finely divided particulate materials into spheroidal pellets of a suitable size distribution.

Another object of this invention is to provide an apparatus suitable for pelletizing large quantities of finely divided particulate materials into suitably-sized pellets.

To achieve these and other objects which will become apparent from the accompanying description and claims, an apparatus is provided which comprises in combination:

(a) a generally vertically oriented housing having an inlet at the upper end and an outlet at the lower end, and (b) a plurality of half catenary-shaped baffles fixedly mounted in the housing along the vertical axis thereof at spaced-apart successively lower elevations, the baffles being spaced apart in a direction transverse to the vertical axis of the apparatus and arranged such that (i) the concave surface of the baffles alternately face in opposing directions toward the center of the housing, and (ii) the exit lip of each succeeding baffle extends beyond the vertical plane of the exit lip of the preceding baffle to define a cascading and alternately reversing flow path along the vertical axis of the apparatus.

BRIEF DESCRIPTION OF THE DRAWINGS

In the specification, reference will be made to the drawings in which.

DESCRIPTION OF THE PREFERRED EMBODIMENTS

Figure 1:
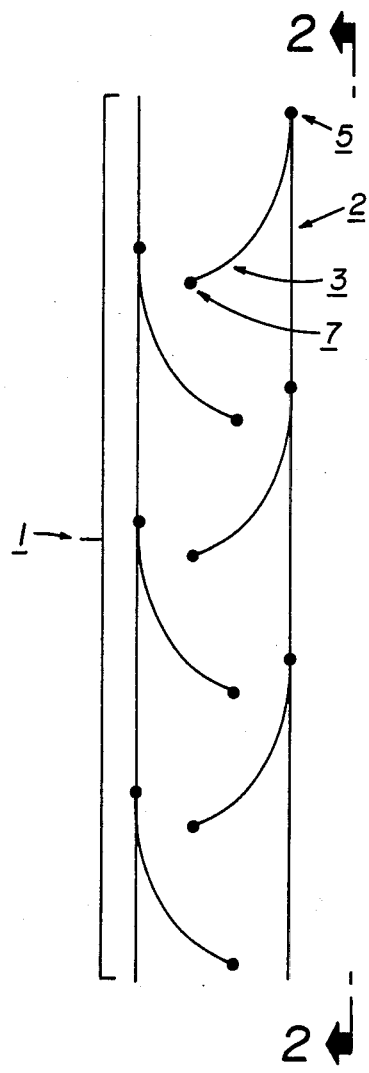
FIG. 1 is an elevation seen in cross-section of the pelletizing apparatus of this invention.

In accordance with this invention, an apparatus is provided for the pelletization of finely divided particulate materials. The apparatus comprises in combination:

(a) a generally vertically oriented housing having an inlet at the upper end and an outlet at the lower end, and (b) a plurality of half catenary-shaped baffles fixedly mounted in the housing along the vertical axis thereof at spaced-apart successively lower elevations, the baffles being spaced apart in a direction transverse to the vertical axis of the apparatus and arranged such that (i) the concave surface of the baffles alternately face in opposing directions toward the center of the housing, and (ii) the exit lip of each succeeding baffle extends beyond the vertical plane of the exit lip of the preceding baffle to define a cascading and alternately reversing flow path along the vertical axis of the apparatus.

Referring to all FIGURES, schematic representations of the pelletizing apparatus of this invention (1) are shown in different perspectives. And as previously noted, apparatus 1 comprises in combination a housing (2) and a plurality of half catenary-shaped baffles (3). The principal functions for housing 2 are (a) to provide a support to which baffles 3 can be fastened or attached and (b) to provide an enclosure to retain the finely divided particulate materials as it cascades down the alternately reversing flow path defined by baffles 3 during pelletizing operations.

Figure 2:
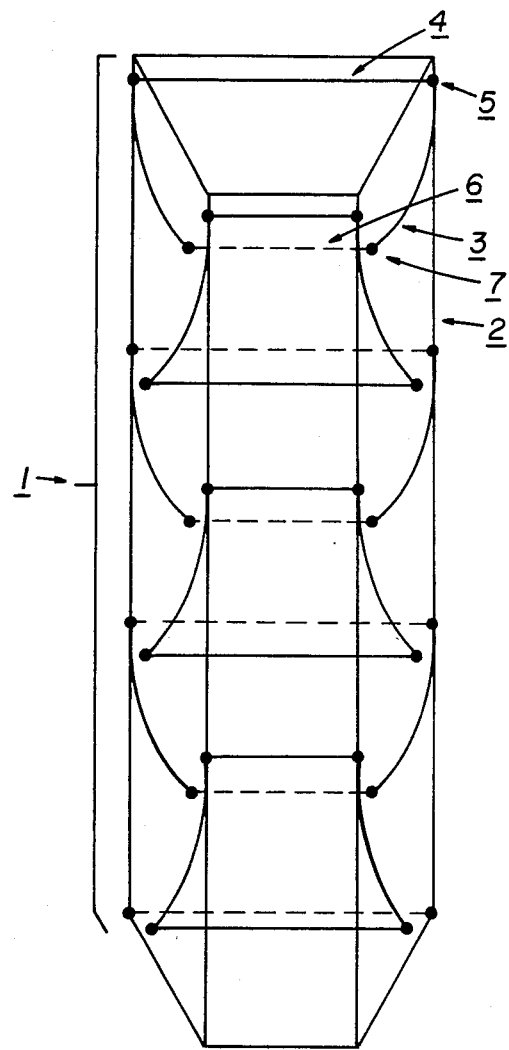
FIG. 2 is an elevation of the pelletizing apparatus of this invention along the line 2—2 in FIG. 1, as seen in perspective after a 90°-rotation in space.

Fixedly mounted in housing 2 is a plurality of half catenary-shaped baffles (3). Baffles 3 are mounted in housing 2 along its vertical axis at spaced-apart successively lower elevations. Baffles 3 also are spaced apart in a direction transverse to the vertical axis of apparatus 1 and are arranged in a manner such that the concave surfaces thereof alternately face in opposing directions toward the center of housing 2. In this arrangement, the exit lip of each succeeding baffle (3) extends beyond the vertical plane of the exit lip of the preceding baffle (3) to thereby define a cascading and alternately reversing flow path along the vertical axis of the apparatus (1). Each of baffles 3, as shown in FIG. 2, is attached at the upper end to a substantially rigid support (4) and at the lower end (or exit lip) to a substantially rigid support (6). Each of these supports (4 and 6) is in turn attached to housing 2 in the desired manner. In general, supports 4 and 6 are metal rods fastened, respectively, to housing 2 with fastening means 5 and 7, such as bolts, screws, or clamps. As an example, a male-threaded support 4 and 6 may be readily mounted in housing 2 with a female-threaded bolt.

Figure 4:
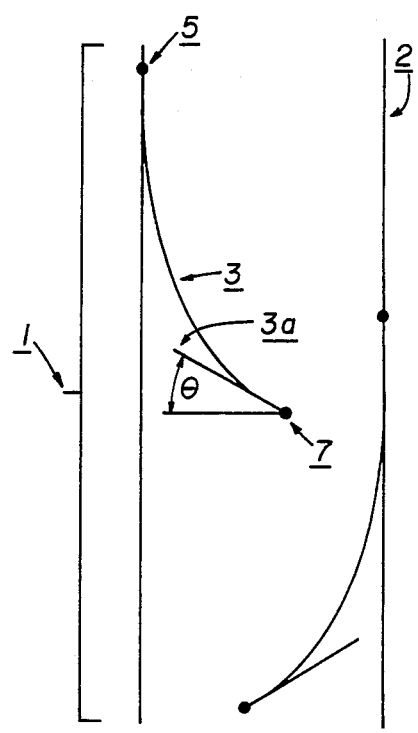
FIG. 4 is a sectional schematic seen in cross-section of a preferred embodiment of the half-catenary shaped baffles fitted with an exit lip tilt backing plate.

As previously noted, support 6 is fastened or mounted to housing 2 in a manner similar to that described for support 4. However, in a preferred embodiment, which is represented schematically in FIG. 4, support 6 is integrally combined with a backing plate (3a). Backing plate 3a is secured to baffle 3 by fastening means such as rivets. The presence of backing plate 3a permits ready adjustment of the acute angle $\theta$ formed by the slope of baffle 3 at the exit lip relative to the horizontal plane. This arrangement controls the tumbling action of the particulate materials, which, in turn, controls the effectiveness of the pelletizing operation.

The absolute dimensions of the pelletizing apparatus 1 and its component parts are not narrowly critical. All that is necessary is that the dimensions are such that sufficient capacity is provided to accommodate the quantity of particulate material being passed through the apparatus to be pelletized over a given time period during pelletizing operations. Accordingly, the choice of dimensions for pelletizing apparatus 1 to accommodate a given quantity of particulate material is well within the expertise of one skilled in the art.

Figure 3:
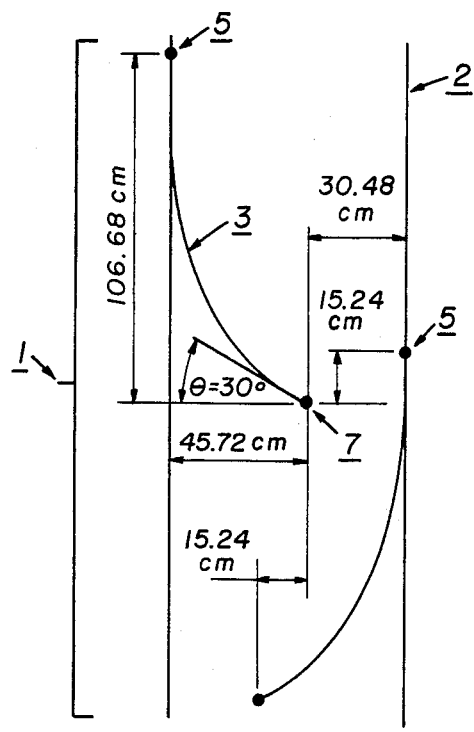
FIG. 3 is a sectional schematic seen in cross-section of a preferred embodiment of the half-catenary shaped baffles as arranged in the housing of the pelletizing apparatus of this invention.

Referring to FIG. 3, in a preferred embodiment designed for large-quantity commercial operations, baffles 3 having dimensions of 121.92 cm (48 inches) long × 50.8 cm (20 inches) wide are hung over a height of 106.68 cm (42 inches) to provide the half-catenarian shape. These dimensions cause the depth of baffles 3 (from front to back) to be about 45.72 cm (18 inches). The exit lip of each baffle 3 is adjusted to provide an exit lip angle ($\theta$) of about 30°. This exit lip angle advantageously ensures that the trajectory of the tumbling particulate materials leaving the exit lip of a given baffle 3 is such that the angle of impingement on the vertical wall of the next lower spaced baffle 3, the top edge of which rises above the exit lip of the preceding baffle 3 to a height of about 10.16 cm to about 15.24 cm (4 inches to about 6 inches), preferably the latter, is about 50°. This, in turn, ensures that the particulate material is deflected smoothly downward against baffle 3 and commences tumbling, as opposed to sliding, immediately after impact. This arrangement also ensures that sufficient momentum is preserved after impact for the particulate material to be accelerated by gravity to velocities sufficient to maintain the desired tumbling action and prevent stagnation of the particulate material and, ultimately, clogging of the apparatus. Suitable velocities in general range from about 2.44 m/sec. to about 3.96 m/sec. (8 ft/sec. to about 13 ft/sec.).

Again referring to FIG. 3, the vertical wall of the succeeding baffle (3) is spaced-apart from the exit lip of the preceding baffle 3 by a distance sufficient to ensure that the desired impingement and tumbling action will occur. In general, a distance of about 30.48 cm (12 inches) is sufficient. It will be recognized, of course, that such values will vary from those specified herein depending on the overall absolute dimensions and capacity of the apparatus. For example, the dimensions of a bench scale unit would proportionately differ from the dimensions of a commercial scale unit although the ratios of height, width, and the like might be identical.

As will be appreciated, the number of baffles 3 employed in apparatus 1 can vary as desired. The greater the number of baffles 3, however, the more effective and more complete will be the pelletization. Thus, for example, six baffles will provide more effective and more complete pelletization of a given particulate material than would, say, three baffles. However, as a practical matter, the number of baffles 3 employed will be limited by the availability of vertical space within which to construct the apparatus, and the choice of any given number of baffles (as well as the overall dimensions) is well within the expertise of one skilled in the art. Moreover, a plurality of apparatus 1 can be arranged in series and so operated to provide any desired number of pelletization steps. Similarly, the partially pelletized material may be recirculated or recycled repeatedly through apparatus 1 in order to achieve the desired level of pelletization.

Materials of constructions for apparatus 1 are not narrowly critical. All that is necessary is that the materials of construction be compatible with the particulate material being pelletized and, as a practical matter, that such construction material be resistant to wear and corrosion. Nonlimiting examples of suitable materials include sheet metal, such as stainless steel, aluminum, and zinc, and rubber conveyor belting. Since housing 2 primarily serves to contain the particulate material being pelletized within the cascading and alternately reversing flow path defined by baffles 3, and to provide a support to which baffles 3 can be attached, any of the aforementioned nonlimiting materials of construction may be employed to construct housing 2. On the other hand, a preferred material of construction for baffles 3 is rubber conveyor belting in that such material (a) possesses the desired flexibility to (i) simplify construction and (ii) cushion pellet impact during operation (in order to minimize pellet breakage) and (b) is highly abrasion resistant. In addition, since the particulate material undergoing pelletization is wetted to provide the necessary adhesion among the particles, the normal tendency of such wetted materials to adhere to surfaces with which they come into contact is eliminated by the rubber surface of the rubber conveyor belting materials.

In operation, finely divided particulate or pulverant solid material (which may optionally contain in intimate admixture therewith a suitable amount of a pelletizing aid or binder such as, for example, bentonite or kaolin) is fed into apparatus 1, preferably at a constant rate, while being selectively wetted with a suitable wetting agent. The wet particulate solid material tumbles by gravity through apparatus 1 in a cascading and alternately reversing flow path as defined by the plurality of baffles 3. The tumbling and cascading action forces the dampened particles into intimate contact. The resulting capillary attraction of the particle surfaces and their molecular adhesion holds the particles together in the form of moist pellets.

Nonlimiting examples of suitable wetting agents include, for example, water, phosphoric acid, calcium lignin-sulfonate liquors, and sodium silicate solution. Of these wetting agents, water is generally preferred.

to about 15 weight percent. The particulate solid material was fed into apparatus 1 at a rate of $9.072 \times 10^2$ kg/min ($2.00 \times 10^3$ lbs/min) over an one hour period. The results and parameters are tabulated in Table 1.

TABLE 1

| Particulate Solids | | | Pellet Mesh Size Dist.,[1,2] wt % | | |
|---|---|---|---|---|---|
| Condition | Water Content[1] wt % | Pelletization Step | +8 Mesh | +16 Mesh | −16 Mesh |
| Unpelletized | 11.39 | — | 41.73 | 21.44 | 36.72 |
| Pelletized | 14.34 | 1 | 80.54 | 11.15 | 8.26 |
| Pelletized | 13.44 | 2 | 88.90 | 7.22 | 3.87 |

[1]Statistical average for 16 (pelletization step 1) and 13 (pelletization step 2) experimental runs, respectively.
[2]U.S. Standard Sieve Size (8 Mesh = 2.36 mm; 16 Mesh = 1.18 mm opening).

The actual amount of water (as supplied by the wetting agent) employed during the pelletization step will depend upon the nature of the particulate solid material being pelletized, particle size distribution, type and amount of additives present, size of pellets desired, and the like. Thus, the proper pelletizing moisture content for the production of pellets for any given particulate material is confined to a relatively narrow range in that an excess of water reduces the capillary attraction of the particles, while insufficient water reduces the surface area over which the capillary forces can act. In one embodiment of the instant invention, an amount of wetting agent to provide water in an amount sufficient to constitute from about 12 weight percent to about 15 weight percent, based on the dry weight of the particulate solid material, was employed.

The moist pellets exiting from apparatus 1 may be dried in air or an inert atmosphere such as nitrogen at either ambient temperatures or elevated temperatures as desired. In addition, the dried pellets may be heat treated to harden the surface and increase the abrasion resistance during subsequent operations.

The following specific examples illustrating the best presently known methods of practicing this invention are described in detail in order to facilitate a clear understanding of the invention. It should be understood, however, that the detailed expositions of the application of the invention while indicating preferred embodiments are given by way of illustration only and are not to be construed as limiting the invention since various changes and modifications within the spirit of the invention will become apparent to those skilled in the art from this detailed description.

EXAMPLE 1

Apparatus 1 containing six 121.92-cm (48 inches) long × 50.8 cm (20 inches) baffles (3) arranged as shown in FIGS. 1 and 3 was employed. Particulate finely divided material suitable for use as nodulizing kiln feed for the production of nodules for feed material in an electrothermal furnace to produce elemental phosphorus was fed to apparatus 1 on a conveyor belt while being selectively wetted by finely divided water spray to provide a water content of about 12 weight percent As can be seen, the −16 mesh fines were reduced from 36.72 wt % in the unpelletized feed material to 8.26 wt % in one pelletizing step and 3.87 wt % in two pelletizing steps. This corresponds to a reduction in fines of 77.5% and 89.5%, respectively.

EXAMPLE 2

Apparatus 1 and the procedure described in Example 1 above were employed except that the particulate solid material was fed into apparatus 1 at a rate of $4.082 \times 10^3$ kg/min ($9.00 \times 10^3$ lbs/min) over a 24-hour period. The results and parameters are tabulated in Table 2.

TABLE 2

| Particulate Solids | | | Pellet Mesh Size Dist.,[1,2] wt % | | |
|---|---|---|---|---|---|
| Condition | Water Content[1] wt % | Pelletization Step | +8 Mesh | +16 Mesh | −16 Mesh |
| Unpelletized | 11.74 | — | 38.93 | 13.52 | 47.55 |
| Pelletized | 13.10 | 1 | 76.92 | 10.39 | 12.69 |
| Pelletized | 13.74 | 1 | 78.52 | 12.31 | 9.17 |

[1]Statistical average for 16 experimental runs.
[2]U.S. Standard Sieve Size (8 Mesh = 2.36 opening; 16 Mesh = 1.18 opening).

As with Example 1, the −16 mesh fines were reduced substantially by one pelletizing step. In the first run, the −16 mesh fines were reduced from 47.55 wt % in the unpelletized feed material to 12.69 wt %, while in the second run, the −16 mesh fines were reduced to 9.17 wt %. The runs, therefore, caused a reduction in fines of 73.3% and 80.7%, an average of 77.0% for one pelletization step.

Thus, it is apparent that there has been provided in accordance with the instant invention, an apparatus for the pelletization of finely divided particulate solid materials that fully satisfy the objects and advantages set forth hereinabove. While the invention has been described with respect to various specific embodiments thereof, it is understood that the invention is not limited thereto and that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. An apparatus for pelletizing finely divided particulate materials which comprises in combination:
    (a) a housing having an inlet at the upper end and an outlet at the lower end, and
    (b) a plurality of half catenary-shaped baffles fixedly mounted in the housing along the vertical axis thereof at spaced-apart successively lower elevations, the baffles being spaced apart in a direction transverse to the vertical axis of the apparatus and arranged such that (i) the concave surface of the baffles alternately face in opposing directions toward the center of the housing, and (ii) the exit lip of each succeeding baffle extends beyond the vertical plane of the exit lip of the preceding baffle to define a cascading and alternately reversing flow path along the vertical axis of the apparatus means for mounting said housing vertically such that particulate materials can flow downward through the housing from baffle to baffle, and means for introducing particulate material into said inlet.

2. The apparatus of claim 1 wherein the number of baffles contained therein is six.

3. The apparatus of claim 1 wherein the baffles' exit lip angle is about 30° relative to the horizontal plane.

4. The apparatus of claim 1 wherein the baffles are constructed of flexible construction material.

5. The apparatus of claim 4 wherein the flexible construction material is rubber conveyor belting.

* * * * *